United States Patent
Trukenmueller

(10) Patent No.: US 10,823,633 B2
(45) Date of Patent: Nov. 3, 2020

(54) METHOD FOR CALIBRATING A BALANCING MACHINE

(71) Applicant: Schenck RoTec GmbH, Darmstadt (DE)

(72) Inventor: Kai Trukenmueller, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 21 days.

(21) Appl. No.: 16/282,751

(22) Filed: Feb. 22, 2019

(65) Prior Publication Data

US 2019/0271609 A1 Sep. 5, 2019

(30) Foreign Application Priority Data

Mar. 2, 2018 (DE) .......................... 10 2018 104 846

(51) Int. Cl.
*G01M 1/14* (2006.01)
*G01M 1/32* (2006.01)
(Continued)

(52) U.S. Cl.
CPC ................. *G01M 1/32* (2013.01); *G01M 1/14* (2013.01); *G01M 1/22* (2013.01); *G01M 1/30* (2013.01)

(58) Field of Classification Search
CPC ............ G01M 1/14; G01M 1/22; G01M 1/30; G01M 1/32
See application file for complete search history.

(56) References Cited

U.S. PATENT DOCUMENTS

| 4,773,019 | A |   | 9/1988 | Martin et al. |
| 4,817,429 | A | * | 4/1989 | Goebel ................. G01M 17/02 73/459 |

(Continued)

FOREIGN PATENT DOCUMENTS

| JP | 2012-002615 A | 1/2012 |
| JP | 2012-088058 A | 5/2012 |

OTHER PUBLICATIONS

Xiaoping Yu, "General Influence Coefficient Algorithm in Balancing of Rotating Machinery", International Journal of Rotating Machinery, Taylor & Francis Inc., 2004 pp. 85-90 (6 pages).

(Continued)

*Primary Examiner* — Natalie Huls
(74) *Attorney, Agent, or Firm* — Collard & Roe, P.C.

(57) ABSTRACT

A method is described for calibrating a balancing machine, in which a rotor (1) to be corrected is rotatably mounted in bearings (2) and a correction run k is performed, wherein at least one measuring sensor (3) determines an initial vibration of the rotor (1) prior to an imbalance correction and transmits this vibration to an evaluation device (4), which stores the measured value as vibration vector $\vec{s}_0$. After an imbalance on the rotor (1) is corrected, a residual vibration of the rotor (1) is measured by measuring sensor (3), transmitted to the evaluation unit (4) and stored as vibration vector $\vec{s}_1$. The difference $\delta\vec{s} = \vec{s}_1 - \vec{s}_0$ formed from the measurement data and the corrected imbalance is stored for compensation run k as $\delta\vec{s}_k$ and $\vec{u}_k$ by the evaluation unit (4). To undertake a calibration of the machine, one can either determine a process calibration matrix K by solving the equation system $S = UK^T$ using the collected measurement data or one can select an already available process calibration matrix using the initial vibration $\vec{s}_0$ and/or imbalance (Continued)

vector $\vec{u}$ and store it as a calibration matrix in the evaluation unit (4) and use it to calculate an unknown imbalance vector of a rotor (1).

6 Claims, 1 Drawing Sheet

(51) Int. Cl.
*G01M 1/30* (2006.01)
*G01M 1/22* (2006.01)

(56) References Cited

U.S. PATENT DOCUMENTS

| | | | | |
|---|---|---|---|---|
| 4,926,341 A * | 5/1990 | Guyot | ............... | G01M 1/00 700/279 |
| 5,084,643 A * | 1/1992 | Chen | ............... | G01M 1/20 310/90.5 |
| 5,240,358 A * | 8/1993 | Hackett | ............... | B23Q 11/0035 409/141 |
| 5,396,436 A * | 3/1995 | Parker | ............... | G01M 1/225 700/279 |
| 6,415,661 B1 * | 7/2002 | Wiese | ............... | G01M 1/22 73/462 |
| 2003/0213302 A1 * | 11/2003 | Miura | ............... | G01M 1/20 73/462 |
| 2003/0221487 A1 * | 12/2003 | Silvagi | ............... | G01M 1/02 73/462 |
| 2005/0160811 A1 * | 7/2005 | Dyer | ............... | G01M 1/22 73/462 |
| 2009/0177419 A1 * | 7/2009 | Yamanaka | ............... | G01M 1/36 702/56 |
| 2011/0238335 A1 * | 9/2011 | Sharp | ............... | G01M 1/22 702/56 |
| 2013/0186170 A1 * | 7/2013 | Trukenmueller | ............... | G01M 1/02 73/1.14 |
| 2018/0073953 A1 * | 3/2018 | Guo | ............... | F16F 15/28 |

OTHER PUBLICATIONS

Mark S. Darlow, "Balancing of High-Speed Machinery: Theory, Methods and Experimental Results", Mechanical Systems and Signal Processing, Academic Press Inc. (London) Limited, 1987, pp. 105-134 (30 pages).

European Search Report in EP Application No. 19160398.4-1001 dated Jul. 15, 2019 with English translation of Relevant Parts.

* cited by examiner

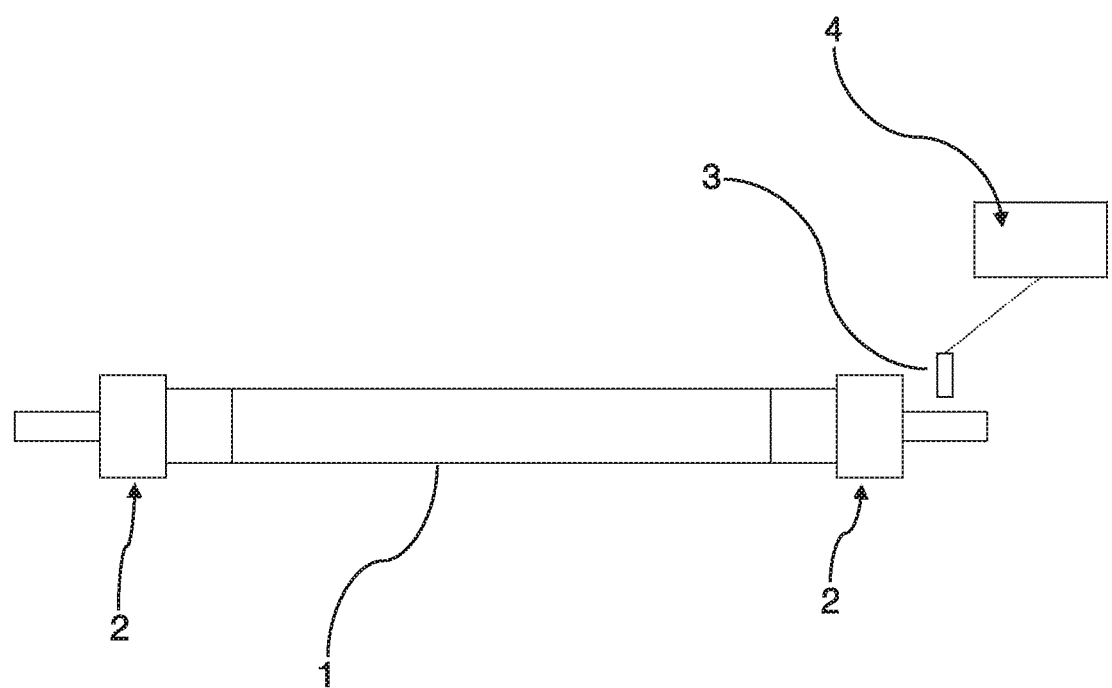

METHOD FOR CALIBRATING A BALANCING MACHINE

CROSS REFERENCE TO RELATED APPLICATIONS

Applicants claim priority under 35 U.S.C. § 119 of German Patent Application No. 10 2018 104 846.7 filed Mar. 2, 2018.

FIELD OF THE INVENTION

The invention relates to a method for calibrating a balancing machine in a correction run k, in which a rotor to be corrected is rotatably mounted in bearings and accelerated by means of a drive unit.

BACKGROUND OF THE INVENTION

When calibrating a balancing machine, during series production, a master part, e.g., a master rotor, is produced out of a production part, which allows one to attach known test imbalances. Using this master, the balancing process is calibrated in the sense of adjusted, by attaching a test weight in each case for every imbalanced plane and measuring the vibration. In addition, the vibration of the rotor is measured without test weights. From the differences, one can determine the influence of the imbalance on the vibrations.

The influence coefficient matrix resulting from this is stored in the measuring device and subsequently used for the imbalance measurement of every additional part. The influence coefficient procedure is often used in connection with shaft-elastic rotors; however, it can also be used when balancing rigid rotors. In the case of rigid rotors, the magnitude of the influence coefficient matrix is simply smaller and only a fixed rotational speed is used.

$\vec{s}$ is the vector of the vibration parameter of a measuring run of length M, the number of measurement points. A measurement using a sensor or the measurement given a fixed rotational speed or a rotational speed interval is generally designated as a measurement point. If multiple sensors or multiple rotational speeds are used, M is the product of the number of sensors and the number of sampling points.

The imbalances of the planes are stored in imbalance vector $\vec{u}$. The length of the vector is P, the number of imbalance planes.

Assuming a linear transmission behaviour of the imbalances on the measured vibrations, the system can be expressed as a linear equation system:

$$\vec{s} = K\vec{u}$$

K in this case is the influence coefficient matrix or the calibration matrix. It has the dimension M×P.

Both the elements of vibration vector $\vec{s}$ as well as the imbalance vector and the influence coefficient matrix are complex numbers. In regard to vibration parameters, these refer to the first-order amplitude and phase of a rotational speed sensor; in regard to imbalance values, they refer to the amount and angle of the imbalance of the rotor.

Calibration matrix K is identified in the calibration process by means of the master calibration using test imbalances.

When matrix K is known, one can calculate from every measurement run (including new parts of the same design) an imbalance vector from the vibration value vector. This is done by solving the linear equation system, if K is a quadratic matrix, or by means of the linear correction calculation if K has more lines than columns, in other words is over-determined.

The known calibration procedures that use master parts may contain errors, which subsequently affect the entire production process. The result is unnecessarily poor imbalance correction.

SUMMARY OF THE INVENTION

The invention therefore addresses the problem of providing an alternative calibration of a balancing machine.

The object is achieved according to the invention by providing a method for calibrating a balancing machine in a correction run k, in which a rotor to be corrected is rotatably mounted in bearings and accelerated by means of a drive unit, comprising the following steps:
a. in which at least one measuring sensor determines an initial vibration of the rotor prior to correcting an imbalance and transmits that vibration to an evaluation device, which stores the measured value as vibration vector $\vec{s}_0$,
b. in which an imbalance on the rotor is corrected,
c. in which a residual vibration of the rotor is measured by the measuring sensor, is transmitted to the evaluation unit and stored as vibration vector $\vec{s}_1$,
d. in which the difference $\delta\vec{s} = \vec{s}_1 - \vec{s}_0$ and the corrected imbalance for the correction run k is stored as $\delta\vec{s}_k$ and $\vec{u}_k$ by the evaluation unit,
e. in which from the measurement data, one determines a process calibration matrix K by solving the equation system $S = UK^T$, or by using the initial vibration $\vec{s}_0$ and/or the imbalance vector $\vec{u}$, one selects an already existing process calibration matrix and
f. in which the process calibration matrix is stored according to step e, as a calibration matrix in the evaluation unit and is used to calculate an unknown imbalance vector of a rotor.

The balancing machine is thus calibrated during the correction run so that no separate calibration run using a master part is necessary. In addition, the calibration of the balancing machine can be performed in any correction run or at defined points in time. A rotor within the meaning of the invention is a rotating body. The method can be applied to various balancing machines, which are used for balancing various rotating bodies (for example, shafts, turbocharger rotors, and so on). One advantage of the method according to the invention is that in particular only two measurements are required per rotor, namely one prior to and one after the correction, even when the rotor has more than one imbalanced plane.

To measure the rotor to be currently balanced, one utilises in particular the currently available process calibration matrix, wherein the measurement data of the rotor can be utilised to improve the process calibration matrix.

The method proves to be particularly advantageous since it is implemented particularly when the calibration using a master part is either relatively very error-prone or the correction cannot exactly follow the imbalance specification and a systematic error results (for example, drilling depth, angle error).

The process calibration matrix can be determined using the equation system $S = UK^T$ and be stored as the calibration matrix in the evaluation unit, so that when balancing additional rotors one can use this calibration matrix to calculate the imbalance vector. However, one can also resort to an already existing process calibration matrix. In regard to this, it is preferred that parameters (for example, initial vibrations, imbalance, magnitude of a geometrical error, e.g., of the bearing play, and so on) of the rotor to be balanced match those of the rotors with whose measurement data the stored process calibration matrix was created.

It is preferred that for every balancing step, matrix S contains a line having a transposed vibration vector $S_k = \delta \vec{s}_k^T$ for step k and that matrix U contains in every line the transposed imbalance vector $U_k = \vec{u}_k^T$ of step k and the process calibration matrix is calculated by transposing $K^T$, wherein a plurality of already balanced rotors are used for calculating the process calibration matrix K using the equation system $S = UK^T$. Equation system $S = UK^T$ can be solved by means of an optimisation procedure, particularly by means of the linear correction calculation procedure. Advantageously, measurement data is used of rotors, which have essentially similar or even identical parameters to those of the rotor to be balanced.

One design provides that already balanced rotors are organised into clusters based on their initial vibration $\vec{s}_0$ and/or their imbalance vector $\vec{u}$, and that from their initial vibrations and/or imbalance vectors a cluster process calibration matrix is calculated, particularly by solving the equation system $S = UK^T$, and it is used as an already present process calibration matrix, wherein a cluster process calibration matrix is selected as an already present process calibration matrix, which comprises the rotors whose initial vibrations and/or imbalance vectors are at least similar to the initial vibration and/or imbalance vector of the rotor to be balanced. It may also be advantageous that instead of the initial vibrations $\vec{s}_0$, the imbalance vectors are used for calculating the cluster process calibration matrix. Any size of cluster can be chosen. One can also use additional rotor parameters to form the clusters.

It may be preferred that a cluster process calibration matrix is interpolated from selected cluster process calibration matrices and that these are used as the already present process calibration matrix. If additional cluster process calibration matrices are on hand and the rotor to be balanced has parameters, which do not allow one to clearly select a cluster process calibration matrix, a new cluster process calibration matrix may be interpolated from the already available cluster process calibration matrices, namely using rotor data, which is essentially identical to the initial vibration and/or imbalance vector of the rotor to be balanced.

Advantageously, the calibration may either occur once for a defined number of rotors or be updated on every run of the balancing machine. The calibration can hereby be improved on every run.

BRIEF DESCRIPTION OF THE DRAWING

An embodiment of the present invention is illustrated in the accompanying drawing and will be described in greater detail in the following. In the drawing, FIG. 1 shows a rotor mounted in a balancing machine.

DETAILED DESCRIPTION OF THE DRAWINGS

FIG. 1 schematically depicts a balancing machine, in which a driven rotor 1 is mounted in bearings 2. Bearings 2 can be soft or rigid bearings. Vibrations of rotor 1 can be calculated from measurement values of a measuring sensor 3 (a vibration sensor, for example). The recorded measurement values are supplied to an evaluation device 4. Additional sensors, such as a rotational speed and angle sensors for example, may be provided. A measuring sensor 3 designed as a vibration sensor can measure vibrations, on bearing stands for example, directly on the rotor or on a housing. The position of measuring sensor 3 is not critical when executing this procedure. The number of sensors can also be adapted to the application in each case.

A drive of the imbalance-measuring device accelerates rotor 1 to a corresponding rotational speed, wherein the drive can also be controlled in such a manner that fixed rotational speeds for balancing can be specified. The measurement values to be recorded can also be recorded in a normal operating mode, so that for example when starting up rotor 1 given predefinable balancing rotational speeds, the measurement values are recorded and supplied to evaluation device 4. Rotor 1 can also be accelerated to its operating rotational speed.

In the method according to the invention, instead of a calibration run using a special master, a process calibration is performed, in which the calibration occurs during the actual balancing of rotor 1, by using the balancing run, in other words the correction run, as a calibration run. In this sense, the method according to the invention can also be referred to as process calibration. The calibration can be used for subsequent rotors. The rotor used for the calibration can benefit from the process calibration when measuring the imbalance after the correction.

In the method according to the invention, the vibration vector is measured for a correction step prior to the correction using a suitable measuring sensor 3 and stored as $\vec{s}_0$ by evaluation device 4. The imbalance is calculated using the currently valid calibration of the balancing machine, i.e., using the calibration, which is already stored in the balancing machine. At the start of production, there are as yet no prior balancing steps that can be used for calculating the calibration. The first calibration and consequently calculating the imbalance can take place using a master calibration. Alternatively, test balancing processes can be undertaken without knowing the actual imbalance. All additional calibrations are performed using the method according to the invention.

Calculated imbalance $\vec{u}$ is corrected on rotor 1 and the vibration is measured again as a residual vibration and stored as $\vec{s}_1$. The difference $\delta \vec{s} = \vec{s}_1 - \vec{s}_0$ and the corrected imbalance for correction run k is stored as $\delta \vec{s}_k$ and $\vec{u}_k$, wherein a correction run or correction step may contain either the same or a new rotor. To calculate process calibration matrix K, one solves the equation system $S = UK^T$. For every balancing step, matrix S hereby contains a line with the transposed vibration vector of step k where $S_k = \delta \vec{s}_k^T$. Correspondingly, matrix U contains in every line the transposed imbalance vector of a step $U_k = \vec{u}_k^T$.

The equation system contains on the right side a matrix U as well as the matrix of $K^T$ as an unknown and can be solved individually for every column S and $K^T$. Since the equation system generally has more lines than columns (more balance steps or rotors 1 are used than imbalanced planes), it is over-determined and can be solved using an optimisation procedure, such as the linear correction calculation method. The process calibration matrix is then determined by transposing $K^T$.

Even though in a normal calibration using a rotor 1, P+1 calibration runs are required for P planes, the method according to the invention also works using one correction step per rotor 1, regardless of the number of planes. This is one advantage of the method because in series processes, a short cycle rate is important and thus there is often the requirement to have only one correction step. It has been shown that using the method according to the invention, a short cycle rate can be achieved.

In the method, the process calibration matrix is used to calculate the imbalance utilising the influence coefficient procedure. In this context, it is pointed out that the influence coefficient procedure is often used with shaft-elastic rotors. However, the influence coefficient procedure can be understood to be a general procedure that is used when balancing rigid as well as shaft-elastic rotors. In regard to rigid rotors, the size of the influence coefficient matrix, which is also referred to as process calibration matrix within the meaning of the invention, is simply smaller and only a fixed rotational speed is used. Alternatively, another optimisation procedure can be used to calculate the imbalance.

Since a large number of rotors 1 are used in the process calibration, one obtains good results for measurement values, despite a high error count. Scattering errors are decreased when solving the over-determined equation system and only the systematic transmission behaviour of rotor 1 is determined. This is a major advantage compared to using a single master rotor, which due to its individual bearing properties, does not need to be representative for production diversity, so that an exact and error-free calibration cannot be ensured.

Process calibration can either be performed one time for a certain selection of rotors 1 or correction steps, or be updated continuously. Steps a. to d. of the method for determining the measurement data and calculating process calibration matrix K can be repeated using n-rotors. In this type of an updated calibration, a certain number of previous measurement runs are always used (for example, the last 200 rotors). One can hereby ensure that the calibration takes into account slow changes in the process (for example, the wearing of a tool or modifications in the upstream production step). In regard to selecting the steps, additional rules can be defined, for example that only parts are to be used whose input parameters lie within certain limits. One can hereby exclude particularly small correction imbalances for example, whose uncertainty range is larger than their benefit. If the update occurs automatically without any intervention by the operator, one can refer to the process as "self-learning."

In the series-related balancing of turbocharger body groups, it has been shown that the vibration behaviour depends in a non-linear manner on the input imbalances, which results in that systematic balancing errors are generated as a function of the magnitude of the input vibrations. Various calibration matrices result when input data of various amplitudes is used. Systematic correction errors increase, particularly for large initial imbalances. In regard to this, it has proven to be advantageous that rotors are organised into clusters according to their initial vibration $\vec{s}_0$ and/or their imbalance vector $\vec{u}$, and their initial vibrations and/or imbalance vectors form a cluster process calibration matrix, which is used as an already available process calibration matrix. This means that one can use already existing process calibration matrices. By means of the initial vibration in the initial state for example, one decides for which calibration a respective run can be used, i.e., which cluster process calibration matrix is selected or whether the current process calibration matrix would be advantageous. In calculating the imbalance, the stored process calibration matrices are selected using the magnitude of the initial vibrations.

To select the input value, one must calculate a scalar (or multidimensional) selection value from the vibration level. This can be the imbalance quantity for example using an averaged process calibration matrix or the maximum amounts of vibration. To select the process calibration matrix for calculating the imbalance, one can either select the cluster process calibration matrix of the respective cluster or one can interpolate an individual process calibration matrix from the available cluster process calibration matrix.

What is claimed is:

1. A method for calibrating a balancing machine in a correction run k for rotors manufactured in a series process, in which a rotor to be corrected is rotatably mounted in bearings and accelerated by means of a drive unit, comprising the following steps:
   a. in which at least one measuring sensor determines an initial vibration of the rotor prior to the imbalance correction and transmits it to an evaluation device, which stores the measured value as vibration vector $\vec{s}_0$,
   b. in which an imbalance on the rotor is corrected in a correction step, wherein a currently available process calibration matrix K is used to calculate the imbalance,
   c. in which a residual vibration of the rotor is measured by the measuring sensor, is transmitted to the evaluation unit and is stored as vibration vector $\vec{s}_1$,
   d. in which the difference $\delta\vec{s}=\vec{s}_1-\vec{s}_0$ and the corrected imbalance for the correction run k is stored as $\delta\vec{s}_k$ and $\vec{u}_k$ by the evaluation unit and are used to improve the process calibration matrix K or in which an already available process calibration matrix is selected using the initial vibration $\vec{s}_0$ and/or imbalance vector $\vec{u}$, and
   e. in which the process calibration matrix according to step d. is stored as a calibration matrix in the evaluation unit and is used to calculate an unknown imbalance vector of a subsequent rotor by solving the equation system $S=UK^T$, wherein for every balancing step, matrix S contains a line having a transposed vibration vector $Sk=\delta\vec{s}_kT$ for step k and that matrix U contains in every line the transposed imbalance vector $Uk=\vec{u}kT$ of step k and the process calibration matrix is calculated by transposing $K^T$.

2. The method according to claim 1, wherein steps a. to d. are repeated with n-rotors for calculating process calibration matrix K.

3. The method according to claim 1, wherein the equation system $S=UK^T$ is solved according to the linear correction calculation procedure.

4. The method according to claim 1, wherein already balanced rotors are categorized into clusters according to their initial vibration $\vec{s}_0$ and/or their imbalance vector $\vec{u}$ and from their initial vibrations and/or imbalance vectors, one calculates a cluster process calibration matrix and one selects a cluster process calibration matrix as the already available process calibration matrix, which comprises rotors whose initial vibrations and/or imbalance vectors are at least similar to the initial vibration and/or imbalance vector of the rotor to be balanced.

5. The method according to claim 4, wherein a cluster process calibration matrix is interpolated from selected cluster process calibration matrices and that matrix is used as the already available process calibration matrix.

6. The method according to claim 1, wherein the calibration is either performed one time for a defined number of rotors or is updated for every run of the balancing machine.

* * * * *